Feb. 5, 1946.   L. A. KISCH   2,394,076
COMBINED STRAINER AND SUMP
Filed Jan. 25, 1944   2 Sheets-Sheet 2
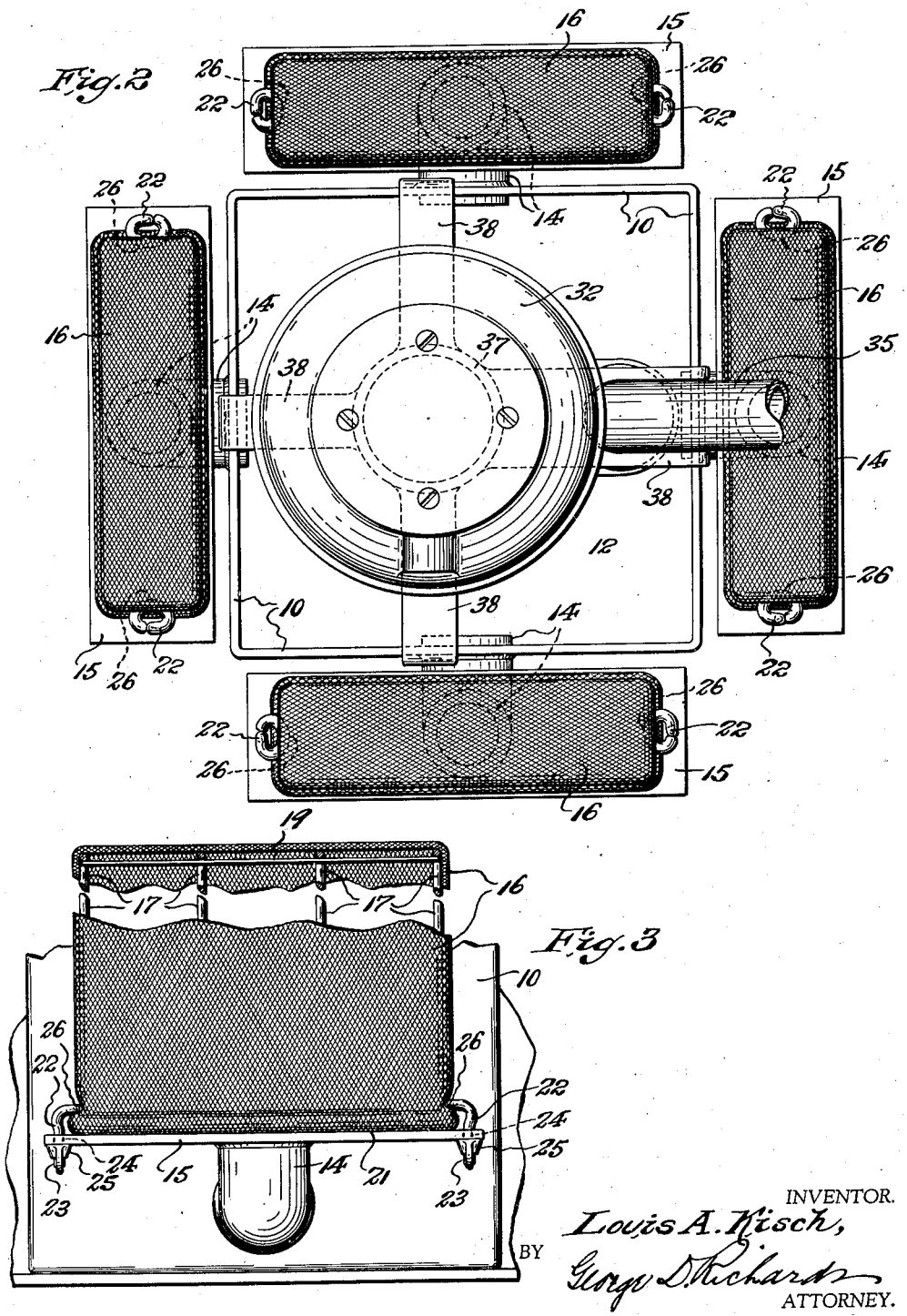
INVENTOR.
Louis A. Kisch,
BY George D. Richards
ATTORNEY.

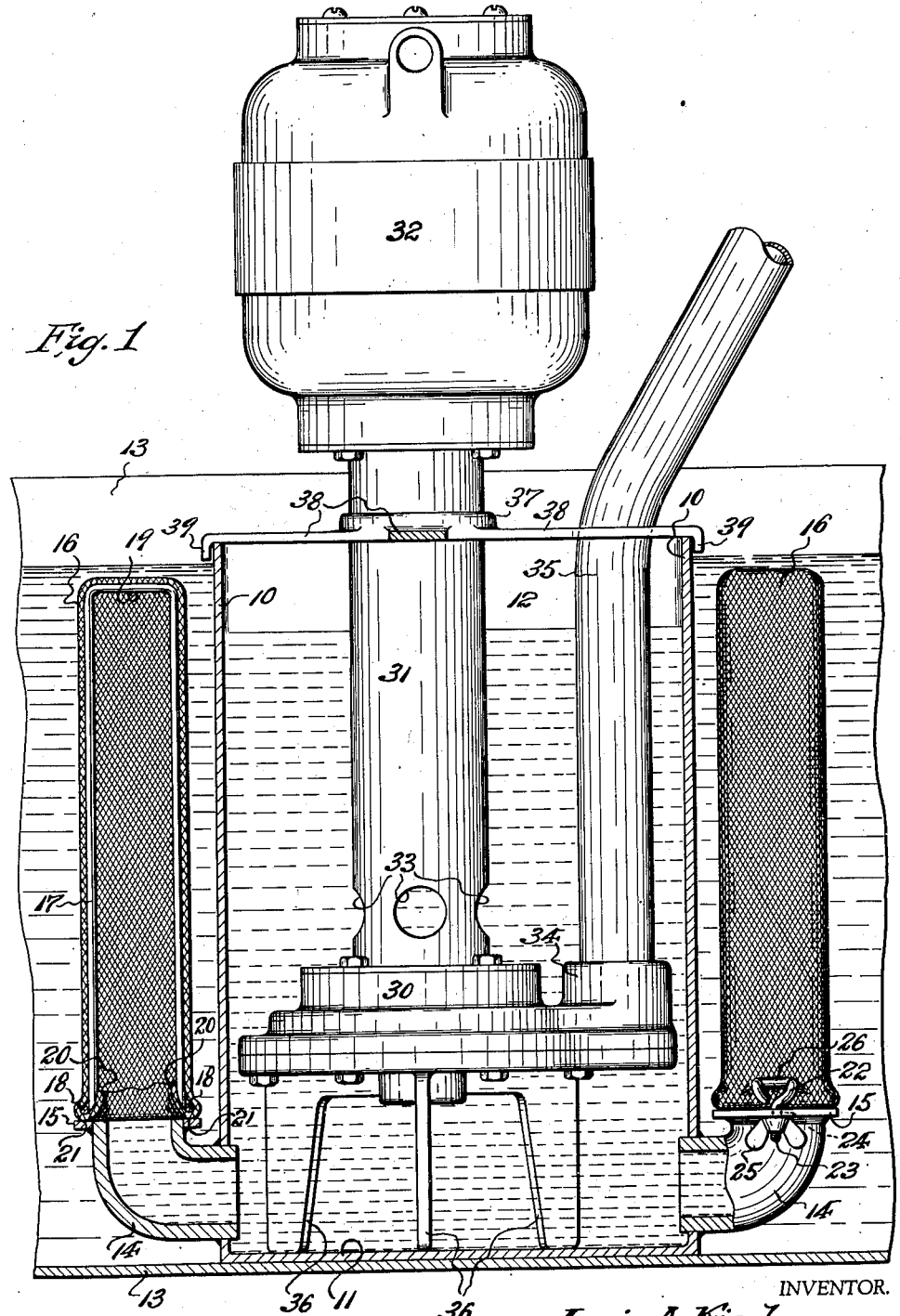

Patented Feb. 5, 1946

2,394,076

UNITED STATES PATENT OFFICE 2,394,076

COMBINED STRAINER AND SUMP

Louis A. Kisch, Little Falls, N. J., assignor to Metal Textile Corporation, West Orange, N. J., a corporation of Delaware Application January 25, 1944, Serial No. 519,608

2 Claims. (Cl. 210—184)

This invention relates to improvements in strainer means for separating suspended solids from liquid passed therethrough, whereby to clarify and cleanse the liquid for initial or repeated use.

The present invention has for an object to provide a novel combined strainer and sump, whereby a segregated quantity of clean liquid, free of undesired suspended solids, may be provided subject to withdrawal by suitable means, such as a pump, for delivery to a desired place of use; as e. g. for service in liquid circulating apparatus employed in connection with machine tools adapted to serve cooling, lubricating or other treating liquid to an operating tool and the material worked thereby, so that the liquid thus circulated may be free of any accumulation of lint, chips, dirt or other foreign substances or particles carried back with the liquid from the operating tool into the liquid supply reservoir with which the combined strainer and sump is associated.

The invention has for another object to provide an upwardly open clean liquid sump or collection chamber having at least one and preferably a plurality of externally related strainer devices coupled thereto for communication with the interior thereof, said sump or collection chamber being adapted to be disposed within the interior of a liquid reservoir, with its open top above the liquid level of the latter, but with the cooperating strainer device or devices submerged within the liquid content of said reservoir, whereby liquid from the reservoir may enter said sump or collection chamber only after being strained by passage through the strainer device or devices.

Another object of the invention is to provide a combined strainer and sump, wherein a novel arrangement and construction of strainer means is furnished calculated to provide a large straining capacity, whereby to deliver into and maintain within the sump, subject to pump discharge, a substantial head of clean liquid.

The invention has for a further object to provide, in combination with a sump or collection chamber, intake means leading into the lower portion thereof, said intake means terminating in a strainer support for mounting bag-like strainer means of liquid pervious material, with the interior of the latter in communication with said intake means; said bag-like strainer means being expanded by inserted open-work frame means having rim means around which marginal mouth portions of the strainer bag means may be folded, and sealingly abutted upon the support, and said bag-like strainer means being detachably secured to said support by manipulatable clamp hooks.

Other objects of this invention, not at this time more particularly enumerated, will be understood from the following detailed description of the same.

An illustrative embodiment of this invention is shown in the accompanying drawings, in which:

Fig. 1 is a vertical sectional view of the combined strainer and sump according to this invention as disposed within the content of a liquid supply reservoir, one of the strainer members being shown in elevation; this view also showing a liquid discharge pump, of the immersion type, as operatively supported in connection with the sump.

Fig. 2 is a top plan view of the combined strainer and sump; this view also showing the liquid discharge pump as operatively supported in connection with the sump.

Fig. 3 is a fragmentary elevational view of the combined strainer and sump, a strainer member thereof being shown in part section.

Similar characters of reference are employed in the above described views, to indicate corresponding parts.

The illustrative form of combined strainer and sump as shown comprises a sump or collecting chamber formed by side walls 10 and a bottom wall 11, the same being open at its top end, thus providing an upwardly open chamber 12 adapted to receive strained liquid through associated strainer means to be presently described. Said sump or collecting chamber is adapted to be disposed within the interior of a supply reservoir 13 containing a liquid desired to be strained and cleaned. The sump or collecting chamber is so dimensioned as to height, or so supported, that its major portion is submerged in the liquid content of said supply reservoir 13, but with its open top end projecting above the level of said liquid content. Said sump or collecting chamber may be of any suitable shape in horizontal cross-section, but for maximum capacity is preferably of rectangular cross-sectional shape.

Affixed to the sump or collecting chamber, to communicate with the lower part of its interior chamber 13, is liquid intake means, the same being provided with means for detachably supporting liquid strainer means in communication therewith. The intake and strainer means may comprise one or more units, but, in order to obtain a maximum of straining capacity, it is preferable to provide a plurality of units respectively springing from different side walls of the sump or collecting chamber.

In preferred form, as shown, each intake and strainer means comprises a conduit means 14 of elbow form affixed to a side wall 10 of the sump or collecting chamber, adjacent to the bottom of the latter, and so as to communicate with the interior chamber 13 thereof. Affixed to the outer end of the conduit means 14 is a supporting plate 15. Said outer end of the conduit means 14 extends through said supporting plate 15 so as to open above the upper side thereof. Said supporting plate may be of any suitable peripheral shape. The strainer means, which is of bag-like form, is mounted on the supporting plate 15 with its mouth end abutted against the latter, thus connecting its interior in communication with said sump intake means 14.

The strainer means per se comprises a bag-like member 16. Said strainer bag member may be selectively made of various materials adapted to provide the necessary liquid pervious interstitial structure suitable for liquid straining effect. The strainer bag member 16 is expanded by means of an open-work frame which is inserted therein. Said frame, in one illustrative form thereof as shown, comprises a series of transverse U-shaped body members 17 made of strong and rigid material, such as metallic wire or rod stock. Said U-shaped members 17 are spaced apart in the direction of the width of the strainer bag member to be served thereby, and to the terminals of their legs is joined a rim member 18 which defines the open or mouth end of the frame. The lower or closed ends of the U-shaped body members 16 are secured together against relative displacement by a transverse tie-rod 19 which extends across said ends. The described elements of the frame are preferably joined together by welding, thus providing a very strong and rigid frame structure. The frame thus provided is of somewhat less length than the length of the strainer bag member 16 to be served thereby.

In use, a frame structure is inserted through the open mouth of the strainer bag member, to extend through the bag member interior to the closed end thereof. The strainer bag member being of somewhat greater length than the length of the frame, when the latter is inserted within the bag member, a marginal portion 20 of the mouth end of the bag member will project exteriorly beyond the frame rim member 18. Such projecting marginal portion 20 of the mouth end of the bag member is turned inwardly and folded over and around the frame rim member 18, and is tucked into the bag member interior. By reason of this arrangement, not only is the strainer bag member and frame structure suitably disposed in operative assembled relation, whereby to expand the former, but the mouth end of the bag member is symmetrically shaped and firmly supported by the enclosed frame rim member 18, whereby to provide an unyieldingly backed but compressible seating and sealing lip portion 21 at the mouth end of the bag member for operative abutment against the top side of the supporting plate 15, with said mouth end in communication with the passage of the conduit means 14 leading into the sump or collecting chamber.

To detachably connect the frame expanded strainer bag member with the supporting plate 15 in the described relation to the latter, manipulatable coupling clamp means is provided. Said coupling clamp means comprises hook-like clamp elements 22 having screw-threaded shanks 23. Marginal portions of the supporting plate 15, preferably at points adjacent the respective ends of the latter and thus adjacent to the respective lateral ends of the bag member mouth portion seated thereon, are provided with through openings 24, through which the shanks 23 of the hook-like clamp elements 22 are passed for downward projection beneath the under side of the supporting plate 15. Engaged on the thus downwardly projecting shanks 23 are thumb-nuts 25, which bear against said under side of the supporting plate 15. To apply the hook-like clamp elements 22 to the frame expanded strainer bag member, the thumb-nuts 25 are loosened to allow said elements 22 to be engaged over the rim member supported mouth end of the bag member, whereupon said elements 22 are pressed inwardly so that their hook extremities 26 may grip and draw down the rim member supported mouth end of the bag member against the supporting plate 15, when the thumb-nuts 25 are screwed home against the under side of the latter. When the rim supported mouth end of the bag member is thrust down upon the supporting plate 15, not only will the bag member be firmly secured or anchored in operative assembled relation to the latter, but the seating and sealing lip portion 21 of the bag member will be compressed, whereby to form a tight union or joint between the bag member and supporting plate, so that no gaps are permitted between these parts which would be likely to permit inflow of unstrained liquid into the strainer bag interior, and thus into the clean fluid collecting chamber 13 of the sump. It will be obvious that, upon releasing the clamp-hook elements 22, the strainer bag member 16 may be quickly and easily dismounted and removed for cleansing and replacement.

In operation, fluid desired to be strained, before withdrawal thereof from the supply reservoir 13, passes through the pervious walls of the strainer bag member or members 16 into the interior thereof, so that solids suspended in said fluid are excluded, and only strained clean fluid enters the bag member or members. The strained clean fluid passes from a bag member interior through the associated intake means 14 into the collecting chamber 12 of the sump 10—11, thus filling the latter with a substantial head of clean fluid.

The clean fluid may be withdrawn from the sump by pumping the same therefrom for delivery to a desired place of use. The sump is especially well adapted to receive within its collecting chamber 12 an immersion type pump, especially an electric motor driven immersion type pump, such e. g. as the coolant pump manufactured and sold under the trade name "GilbarcoCE" coolant pump. A pump of this general type is shown in the drawings, and comprises a rotary pump body 30 having an upstanding hollow or tubular pedestal 31, at the upper end of which is supported the pump driving motor 32. Said pedestal 31 is provided with fluid intake ports 33 which communicate through the pedestal interior with the pump intake. Connected with the pump discharge portion 34 is an upstanding discharge conduit 35 adapted to deliver pumped fluid to a desired place of use. The pump body is usually provided with supporting legs or foot pieces 36 upon which the pump stands. In applying this type of pump to the combined strainer and sump of this invention, the pump body 30 is lowered into the collecting chamber 12 so as to stand on its bottom wall 11.

and so as to be immersed in the clean liquid content thereof, whereby the pedestal 31 rises through the interior of the collecting chamber 12 to project upwardly through the upper open end of the latter, thereby to dispose the motor 32 above and exteriorly of the sump and supply reservoir 13 and their liquid content. The discharge conduit 35 likewise rises through the interior of the collecting chamber 12 of the sump, so as to extend exteriorly from the latter. In many cases, the support of the pump structure by the legs or foot pieces 36 will be adequate, but for a more stable support, a hanger spider 37 may be affixed to and around the upper end of the pedestal 31, substantially in the plane of the open top end of the sump, and said hanger spider 37 is provided with radiating arms 38 to extend over and rest upon the top edges of the sump side walls 10. Preferably said arms 38 terminate in angular lugs 39 to overhang and abut the exterior faces of the sump side walls 10, whereby to prevent lateral shifting and displacement of the hanger spider and the pump unit supported thereby. It will be understood, that the pump structure may be optionally supported in operative assembled relation to the sump by either the legs or foot pieces 36 alone, or by the hanger spider 37 alone, or both of these supporting means may be utilized together if desired.

It will be obvious that the sump provides a means of generous capacity to collect and contain a considerable quantity of strained clean fluid, and so as to provide a substantial head of clean fluid against which the pump may draw.

Having now described my invention, I claim:

1. Strainer apparatus comprising an upwardly open strained liquid receiving chamber adapted to be submerged in liquid to be strained with its open top above the level of the latter, externally projecting up-turned tubular elbow means affixed to the chamber wall adjacent the chamber bottom so as to communicate with the chamber interior, flat transverse supporting plate means affixed to and across the elbow means and through which the latter extends, liquid pervious strainer bag means submerged in the liquid to be strained, said strainer bag means having mouth portions abutting the supporting plate means, frame means within the strainer bag means for supporting and expanding the latter, end portions of the supporting plate means extending beyond adjacent mouth portions of the strainer bag means, releasable clamp hook means mounted on said end portions of the supporting plate means to grip adjacent mouth portions of the expanded strainer bag means, whereby to clamp said bag means to said plate means in upstanding relation thereto exteriorly of and adjacent to the chamber wall and with the interior of said bag means in communication with said elbow means, and means to withdraw strained liquid from said chamber interior.

2. Strainer apparatus comprising an upwardly open strained liquid receiving chamber adapted to be submerged in liquid to be strained with its open top above the level of the latter, an immersion type discharge pump within said chamber, means to support said pump in the chamber, externally projecting up-turned tubular elbow means affixed to the chamber wall adjacent the chamber bottom so as to communicate with the chamber interior, flat transverse supporting plate means affixed to and across the elbow means and through which the latter extends, liquid pervious strainer bag means submerged in the liquid to be strained, said strainer bag means having mouth portions abutting the supporting plate means, frame means within the strainer bag means for supporting and expanding the latter, end portions of the supporting plate means extending beyond adjacent mouth portions of the strainer bag means, and releasable clamp hook means mounted on said end portions of the supporting plate means to grip adjacent mouth portions of the expanded strainer bag means, whereby to clamp said bag means to said plate means in upstanding relation thereto exteriorly of and adjacent to the chamber wall and with the interior of said bag means in communication with said elbow means.

LOUIS A. KISCH.